(12) United States Patent
Suhling

(10) Patent No.: US 11,872,642 B2
(45) Date of Patent: Jan. 16, 2024

(54) DYNAMICALY CONFIGURABLE ARBOR ASSEMBLY APPARATUS

(71) Applicant: Robert James Suhling, Waukegan, IL (US)

(72) Inventor: Robert James Suhling, Waukegan, IL (US)

( * ) Notice: Subject to any disclaimer, the term of this patent is extended or adjusted under 35 U.S.C. 154(b) by 130 days.

(21) Appl. No.: 17/525,406

(22) Filed: Nov. 12, 2021

(65) Prior Publication Data

US 2023/0150041 A1    May 18, 2023

(51) Int. Cl.
*B23B 51/04* (2006.01)
*B23B 31/11* (2006.01)
*B23B 49/04* (2006.01)

(52) U.S. Cl.
CPC ...... *B23B 51/0473* (2013.01); *B23B 51/0426* (2013.01); *B23B 31/11* (2013.01); *B23B 49/04* (2013.01); *B23B 2231/0204* (2013.01)

(58) Field of Classification Search
CPC ............ B23B 51/0473; B23B 51/0426; B23B 51/123; B23B 51/12; B23B 2240/36
See application file for complete search history.

(56) References Cited

U.S. PATENT DOCUMENTS

| | | | |
|---|---|---|---|
| 3,220,449 A * | 11/1965 | Franklin | B23B 51/0426 408/192 |
| 3,267,975 A * | 8/1966 | Enders | B23B 51/0473 408/139 |
| 3,973,862 A | 8/1976 | Segal | |
| 3,999,869 A | 12/1976 | Clark et al. | |
| 4,036,560 A | 7/1977 | Clark et al. | |
| 4,077,737 A * | 3/1978 | Morse | B23B 51/0426 408/206 |
| 4,148,593 A | 4/1979 | Clark | |
| 5,061,126 A | 10/1991 | Cain et al. | |
| 5,108,235 A | 4/1992 | Czyzewski | |
| 5,154,552 A | 10/1992 | Koetsch | |
| 5,226,762 A | 7/1993 | Ecker | |
| 5,246,317 A | 9/1993 | Koetsch et al. | |
| 5,352,071 A | 10/1994 | Cochran et al. | |
| 5,413,437 A | 5/1995 | Bristow | |
| 5,597,274 A | 1/1997 | Behner | |
| 5,658,102 A | 8/1997 | Gale | |
| 5,782,588 A | 7/1998 | Gardner | |
| 5,816,752 A | 10/1998 | Benjamin | |
| 5,829,929 A | 11/1998 | Lewis | |

(Continued)

OTHER PUBLICATIONS

Kr-20180071151, Kim, Jun. 27, 2018, 17 pages.*
DE202016005218, Zhang, Oct. 27, 2016, 19 pages.*

*Primary Examiner* — Alan Snyder
*Assistant Examiner* — Reinaldo A Vargas Del Rio
(74) *Attorney, Agent, or Firm* — Lesavich High-Tech Law Group, S.C.; Stephen Lesavich

(57) ABSTRACT

A dynamically configurable arbor assembly apparatus. The dynamically configurable arbor assembly apparatus provides plural configurations with removable and attachable components that can be dynamically adjusted and configured to be used with a large variety of power tools, lathes and/or milling machines including plural different attachment interfaces. The dynamically configurable arbor assembly apparatus can also replace a chuck component the power tools, lathes and/or milling machines.

10 Claims, 18 Drawing Sheets

(56) References Cited

U.S. PATENT DOCUMENTS

| | | |
|---|---|---|
| 5,868,532 A | 2/1999 | Spenser |
| 5,871,310 A | 2/1999 | Mortensen |
| 5,879,112 A | 3/1999 | Ivey |
| 6,264,055 B1 | 7/2001 | Dozier |
| 6,341,925 B1 | 1/2002 | Despres |
| 6,409,436 B1 | 6/2002 | Despres |
| 6,641,338 B2 | 11/2003 | Despres |
| 6,705,807 B1 | 3/2004 | Rudolph et al. |
| 6,786,684 B1 | 9/2004 | Ecker |
| 6,881,017 B1 | 4/2005 | Krecek et al. |
| 7,073,992 B2 | 7/2006 | Korb et al. |
| 7,104,738 B2 | 9/2006 | Cantlon |
| 7,112,016 B2 | 9/2006 | Nordlin |
| 7,435,041 B1 | 10/2008 | McGill |
| 7,556,459 B2 | 7/2009 | Rompel |
| 8,079,787 B2 | 12/2011 | Chao |
| 8,238,474 B2 | 12/2012 | Pangerc et al. |
| 8,328,476 B2 | 12/2012 | O'Keefe et al. |
| 8,360,696 B2 | 1/2013 | O'Keefe et al. |
| 8,366,356 B2 | 2/2013 | Novak et al. |
| 8,443,972 B1 | 5/2013 | Pendergraph et al. |
| 8,463,765 B2 | 6/2013 | Lesavich |
| 8,646,601 B2 | 2/2014 | Green et al. |
| 8,684,641 B2 | 4/2014 | Moffatt |
| 8,721,236 B2 | 5/2014 | Kazda et al. |
| 8,758,356 B2 | 6/2014 | Fearon et al. |
| 8,919,552 B2 | 12/2014 | Pendergraph et al. |
| 9,037,564 B2 | 5/2015 | Lesavich et al. |
| 9,067,313 B2 | 6/2015 | Green et al. |
| 9,137,250 B2 | 9/2015 | Lesavich et al. |
| 9,186,731 B2 | 11/2015 | Cossaboom |
| 9,361,479 B2 | 6/2016 | Lesavich et al. |
| RE46,103 E | 8/2016 | Novak et al. |
| 9,486,860 B2 | 11/2016 | Kazda et al. |
| 9,545,734 B2 | 1/2017 | Suhling |
| 9,569,771 B2 | 2/2017 | Lesavich et al. |
| 9,682,454 B2 | 6/2017 | Suhling |
| 9,751,135 B1 | 9/2017 | Terris |
| 9,821,380 B1 | 11/2017 | Terris |
| 9,839,966 B2 | 12/2017 | Batho |
| 9,849,553 B2 | 12/2017 | Bialy et al. |
| 10,245,653 B2 | 4/2019 | Suhling |
| 10,336,127 B1 | 7/2019 | Suhling |
| 10,478,904 B2 | 11/2019 | Broekman |
| D871,877 S | 1/2020 | Terris et al. |
| 10,532,412 B2 | 1/2020 | Ward |
| 10,773,315 B2 | 9/2020 | Piper et al. |
| D903,454 S | 12/2020 | Kuhns |
| D926,008 S | 7/2021 | Terris et al. |
| 11,148,212 B2 | 10/2021 | Heath et al. |
| 11,154,940 B2 | 10/2021 | Ward |
| 11,180,171 B1 | 11/2021 | Suhling |
| 11,383,336 B2 | 7/2022 | Suhling |
| 2011/0208710 A1 | 8/2011 | Lesavich |
| 2012/0278622 A1 | 11/2012 | Lesavich et al. |
| 2014/0189792 A1 | 7/2014 | Lesavich et al. |
| 2015/0298273 A1 | 10/2015 | Suhling |
| 2015/0306784 A1 | 10/2015 | Suhling |
| 2015/0379301 A1 | 12/2015 | Lesavich et al. |
| 2016/0321654 A1 | 11/2016 | Lesavich et al. |
| 2018/0043439 A1 | 2/2018 | Suhling |
| 2019/0381614 A1 | 12/2019 | Suhling |
| 2019/0389500 A1 | 12/2019 | Suhling |
| 2020/0001495 A1 | 1/2020 | Suhling |
| 2021/0394319 A1 | 12/2021 | Suhling |
| 2022/0134446 A1* | 5/2022 | Grennhag ........... B23B 51/0473 408/239 R |

* cited by examiner

DYNAMICALY CONFIGURABLE ARBOR ASSEMBLY APPARATUS

CROSS REFERENCES TO RELATED APPLICATIONS

Not applicable.

FIELD OF INVENTION

This application relates to arbors for power tools and hand tools. More specifically, it relates to a dynamically configurable arbor assembly apparatus.

BACKGROUND OF THE INVENTION

A "chuck" is a specialized type of clamp with adjustable jaws used to hold an object with radial symmetry, including a cylinder. In a drill or a mill, a chuck holds a rotating tool; in a lathe, it holds the rotating workpiece. For example, a chuck on a drill is used to hold a drill bit.

A "hole saw," also known as a hole cutter, is a saw blade of annular shape, whose annular kerf creates a hole in the workpiece without having to cut up the core material. It is used in a drill. Hole saws typically have a pilot drill bit at their center to keep the saw teeth from walking.

There are many problems associated with using tool components with power tools.

One problem is that a chuck component requires all tool components have a shaft component to be useable with power tool.

Another problem with using tool components with a power tool with a chuck component is adding the tool components to the chuck component and the shaft component increases a total length of the power tool and prevents it from easily being used in many confined areas.

Another problem is that most tool components require an adapter component that is used with the power tools that cannot be dynamically modified allowing the power tool to be used with many different types of tool component technologies.

Thus, it is desirable to solve some of the problems associated with using chucks and tool components with shaft with power tools.

SUMMARY OF THE INVENTION

In accordance with preferred embodiments of the present invention, some of the problems associated with using tool components with power tools are overcome. A dynamically configurable arbor assembly apparatus is presented.

The dynamically configurable arbor assembly apparatus provides plural configurations with removable and attachable components that can be dynamically adjusted and configured to be used with a large variety of power tools, lathes and/or milling machines including plural different attachment interfaces. The dynamically configurable arbor assembly apparatus can also replace a chuck component the power tools, lathes and/or milling machines.

The foregoing and other features and advantages of preferred embodiments of the present invention will be more readily apparent from the following detailed description. The detailed description proceeds with references to the accompanying drawings.

BRIEF DESCRIPTION OF THE DRAWINGS

Preferred embodiments of the present invention are described with reference to the following drawings, wherein.

DETAILED DESCRIPTION OF PREFERRED EMBODIMENTS

Prior Art

Figure 1:
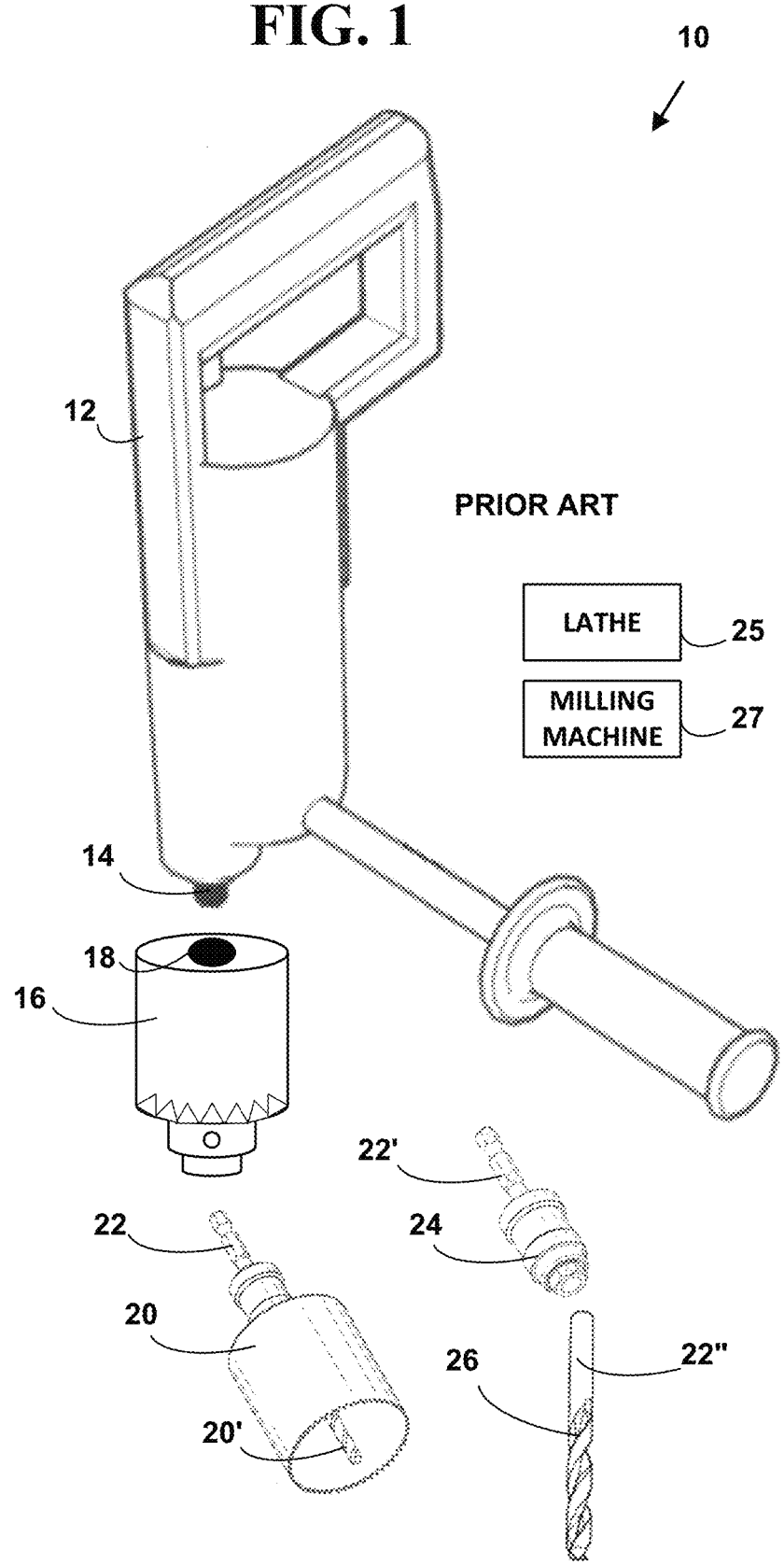
FIG. 1 is a block diagram illustrating a prior art power tool apparatus.

FIG. 1 is a block diagram 10 illustrating a prior art power tool apparatus 12. The prior art power tool apparatus 12 includes a power tool component 12 (e.g., a drill, etc.) a threaded attachment component 14, a chuck component 16 with a threaded receptacle 18 for accepting and engaging the threaded attachment connection component 14 in a rotating motion to tighten and loosen, the chuck component 16, selectively removable and attachable. The prior art power tool apparatus 10 further includes a plural different tool components including, but not limited to, a hole saw 20 with a shaft portion 22, a tool acceptor component 24, with a shaft portion 22' a drill bit 26 with a shaft portion 22". The tool accept component 24 accepts other tool components such as socket components, screwdriver components, drill bits 26, etc.

The chuck component 16 includes a specialized type of clamp with adjustable jaws used to hold an object with radial symmetry, including a cylinder. In a drill or a mill, a chuck holds a rotating tool; in a lathe, it holds the rotating workpiece. For example, a chuck on a drill is used to hold a drill bit. The clamping jaws of the chuck component 16 are opened and closed with a chuck key.

The hole saw 20 also known as a hole cutter, is a saw blade of annular shape, whose annular kerf creates a hole in the workpiece without having to cut up the core material. It is used in a drill. Hole saws typically have a pilot drill bit 20' at their center to keep the saw teeth from walking.

Sockets are tools used to tighten and loosen mechanical fasteners. Sockets fit over a head of a fastener to provide torque to tighten and loosen the fasteners.

The tool components 20, 24, 26 and most tool components known in the art have a shaft component are inserted into the chuck component 16 using the respective shaft components 22, 22', 22".

Exemplary Dynamically Configurable Arbor Assembly Apparatus

An "arbor" includes a spindle used to secure or support material being machined or milled or shaped. A spindle includes a slender rounded rod typically with tapered ends.

The present invention includes a dynamically configurable arbor assembly apparatus that is used to accept, engage and secure plural different types of tool components to be used with power tools 12 (e.g., drills, hammer drills, masonry drills, impact drills, drill presses, magnetic drill, drilling rig, drill guide stand, impact drivers, impact wrenches, torque wrenches, etc.) and/or lathes 25 (e.g., for wood and metal, etc.) and/or milling machines. The dynamically configurable arbor assembly apparatus is used on power tools such (e.g., drills, etc.) by replacing a chuck component on the power tools 12, lathes 25 and/or milling machines 27.

A "lathe" 25 includes a machine tool that rotates a workpiece about an axis of rotation to perform various operations such as cutting, sanding, knurling, drilling, deformation, facing, and turning, with tools that are applied to the workpiece to create an object with symmetry about that axis.

A "milling machine" 27 includes a machine tool that rotates a cutter to produce plane or formed surfaces on a workpiece, usually by moving the work past the cutter.

Figure 2:
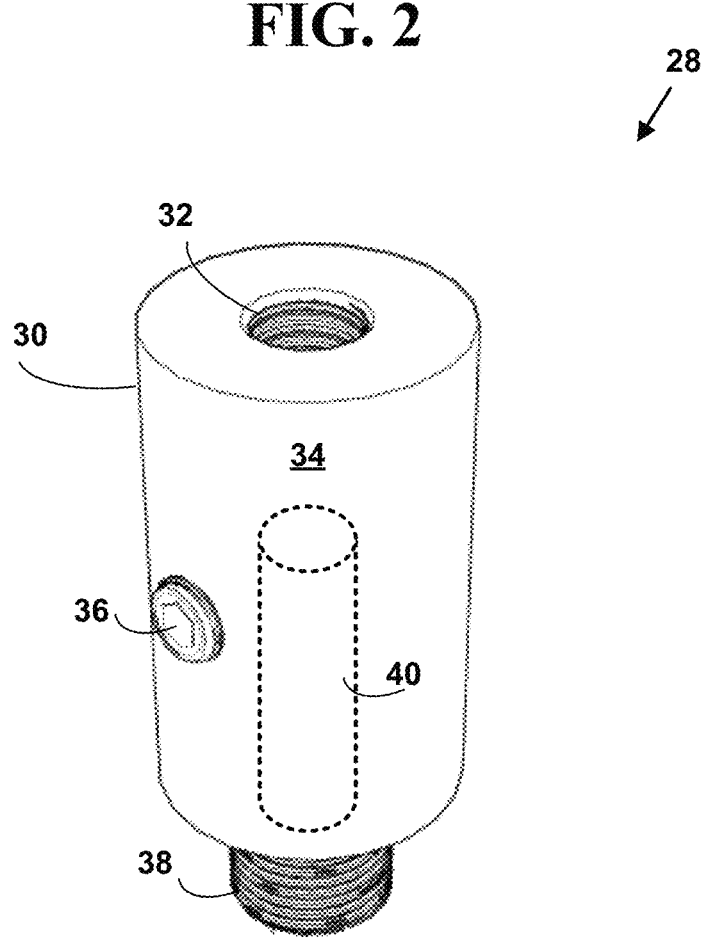
FIG. 2 is a block diagram illustrating a top perspective view of a dynamically configurable arbor assembly apparatus.

FIG. 2 is a block diagram 28 illustrating a top perspective view of a dynamically configurable arbor assembly apparatus 30.

The configurable arbor assembly apparatus 30 includes, but is not limited to, a threaded receptacle connection component 32 on a top surface of a body component 34 for accepting, engaging and securing the apparatus 30 on the power tool 12 and/or on the lathe 25 and/or the milling machine 27, a securing component 36 on a side surface of the body component 34 for securing a tool component inserted within a hollow receptacle 40 in the body component 34 and a threaded connection component 38 on a bottom surface of the body component 34 for accepting, engaging and securing a tool component. The threaded connection component 38 including a hollow receptacle 44 on a bottom surface of the threaded connection component 38 for accepting, engaging and securing the tool component. However, the present invention is not limited to such an embodiment and more, fewer and/or other types of components can be used to practice the invention.

In one embodiment, the body component 34 is made from metal, rubber, plastic, wood, composite materials or other materials and/or a combination of materials. However, the present invention is not limited to such embodiments and more, fewer and/or other types of materials can be used to practice the invention.

In one embodiment, the body component 34 comprises a length of about one to about two inches (about 2.54 to about 5.08 centimeters (cm)). However, the present invention is not limited to such an embodiment and other lengths can be used practice the invention.

In one embodiment, the securing component 36 is a threaded screw with a hexagonal head. However, the present invention is not limited to such embodiments and other securing components 36 with other head types (e.g., flat head, phillips head, square head, star head, etc.) can be used to practice the invention.

The securing component 36 with a hexagonal head is tightened and loosened with an allen wrench or hex key An allen wrench or hex key is L-shaped metal bar with a hexagonal head at each end, used to turn bolts and screws having hexagonal sockets.

In one embodiment, the hollow receptacle 44 includes an oval, circular, square, star or hexagonal shape. The shape of the hollow receptacle 44 is dynamically adjustable by replacing the threaded connection 38 which includes the second hollow receptacle 44 including a different shape for accepting, engaging and securing a desired tool component with a desired specific shape.

However, the present invention is not limited to such embodiments and other shapes for the bottom surface opening can be used to practice the invention.

Figure 3:
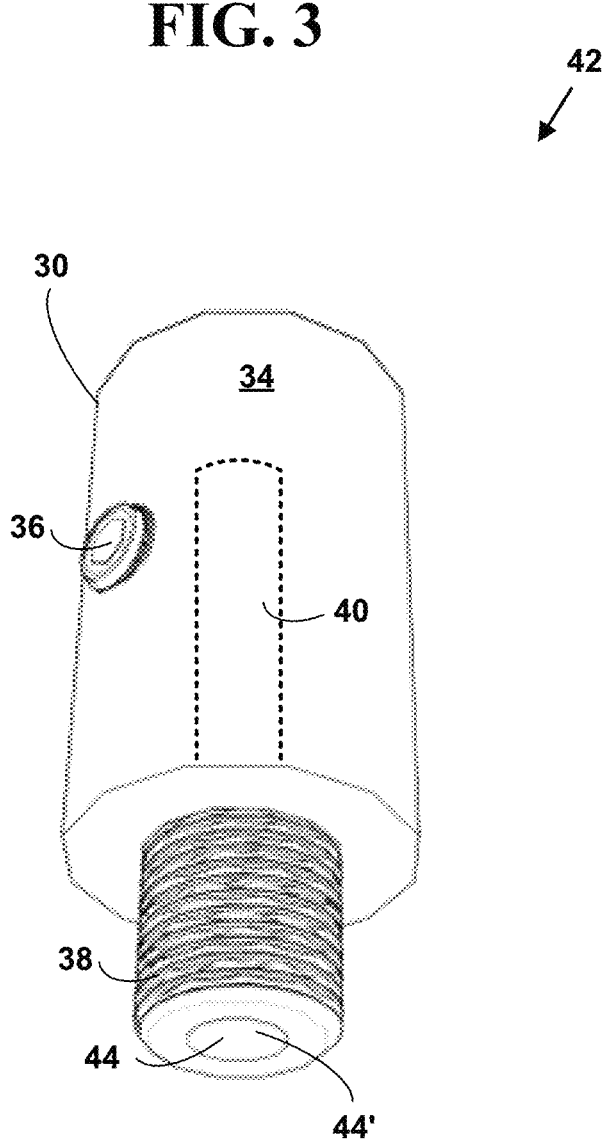
FIG. 3 is a block diagram illustrating a bottom perspective view of the dynamically configurable arbor assembly apparatus.

FIG. 3 is a block diagram 42 illustrating a bottom perspective view of the dynamically configurable arbor assembly apparatus 30.

FIG. 3 illustrates additional details of the threaded connection 38 including the hollow receptacle 44 for accepting, engaging and securing a tool component within the hollow receptacle 40 in the body component 34.

In one embodiment, the hollow receptacle 40 extends completely through the body portion 34 of the configurable arbor assembly apparatus 30.

In another embodiment, the hollow receptacle 40 extends only a pre-determined distance (e.g., about one-quarter to one-half inches or about 0.635 cm to about 1.27 cm). However the present invention is not limited to such embodiments and other embodiments with and/or without the hollow receptacle 40 included in the body portion 34 can be used to practice the invention.

In one embodiment, the interior of the hollow receptacle 44' includes threads in all or a portion of the interior to accept a threaded tool component. In another embodiment, the hollow receptacle 44 does not include threads and is smooth. However the present invention is not limited to such embodiments and other embodiments.

Figure 4:
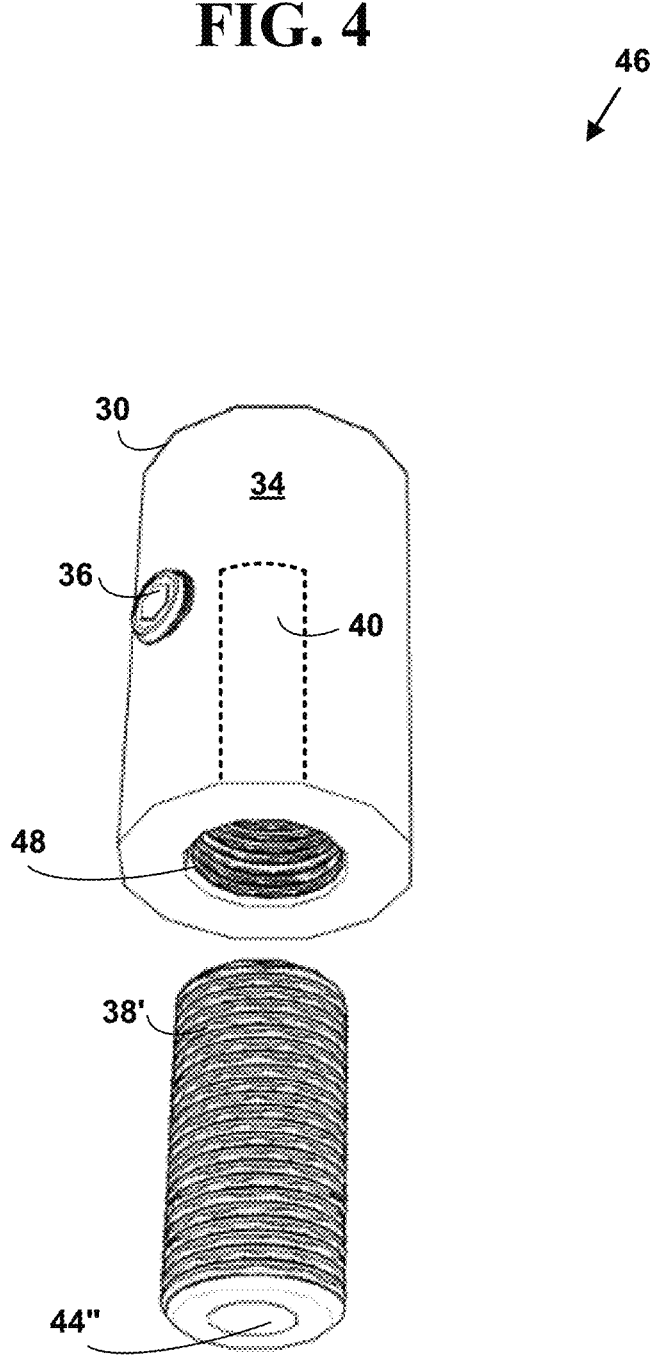
FIG. 4 is a block diagram illustrating another bottom perspective view of the dynamically configurable arbor assembly apparatus.

FIG. 4 is a block diagram 46 illustrating another bottom perspective view of the dynamically configurable arbor assembly apparatus 30.

In FIG. 4, the body component 34 further includes a second threaded receptacle 48 for accepting, engaging and securing a threaded connection component 38' including the hollow receptacle 44". In such an embodiment, the threaded connection component 38' is dynamically attachable and removable and includes one or more different hollow receptacle 44" sizes for engaging, accepting and securing threaded and non-threaded tool components of varying sizes. However the present invention is not limited to such embodiments and other embodiments can be used to practice the invention and the invention can be practiced with and/or without the threaded connection component 38' being dynamically attachable and removable.

Figure 5:
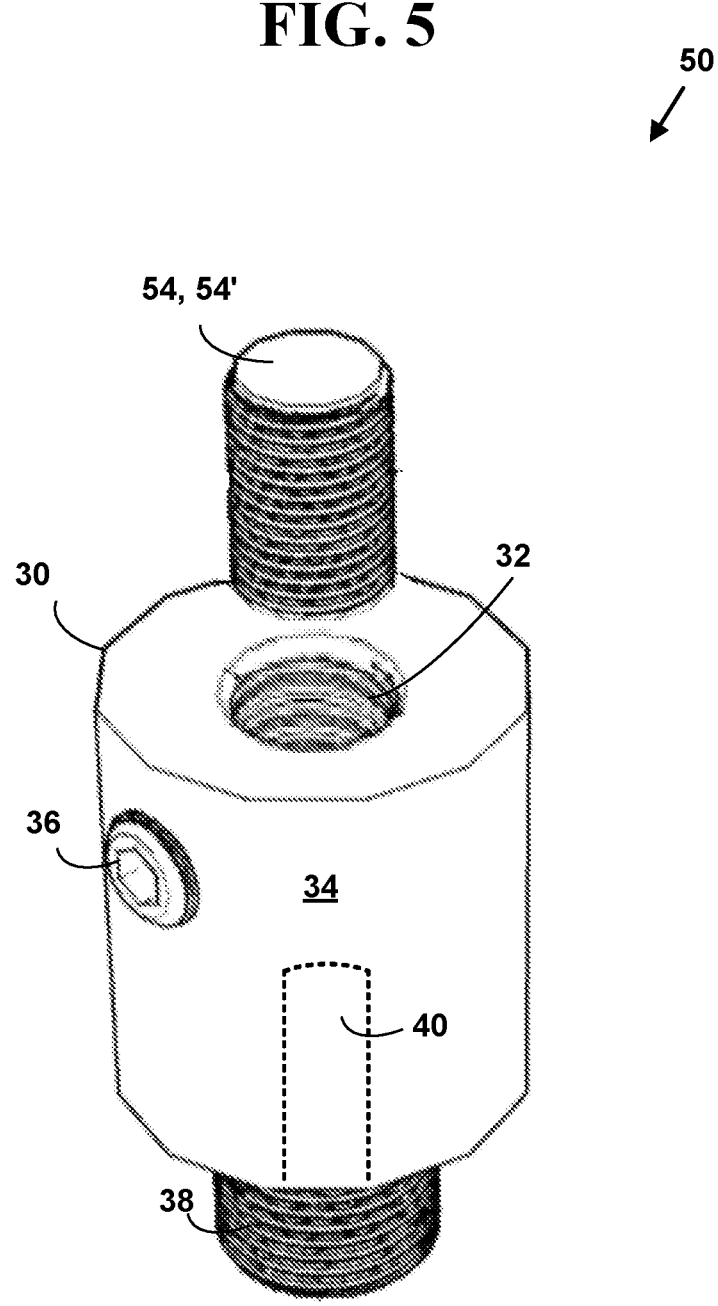
FIG. 5 is a block diagram illustrating another top perspective view of the dynamically configurable arbor assembly apparatus.

FIG. 5 is a block diagram 50 illustrating another top perspective view of the dynamically configurable arbor assembly apparatus 30.

In FIG. 5, the body component 34 further includes a third threaded receptacle 32 for accepting, engaging and securing a second threaded connection component 54.

In such an embodiment, the second threaded connection component 54 is dynamically attachable and removable and includes one or more different sizes for engaging, accepting and securing a threaded component on the power tool 14, lathe 25 and/or milling machine 27 components.

The embodiment in FIG. 5 allows the configurable arbor assembly apparatus 30 to be used with a wider variety of power tools, lathes and milling machines with threaded and/or non-threaded connection components.

However the present invention is not limited to such embodiments and other embodiments can be used to practice the invention and the invention can be practiced with and/or without the second thread connection component 54 and/or with and/or without the second thread connection component 54 being dynamically attachable and removable.

In one embodiment, the second threaded connection component 54 includes a threaded or non-threaded third hollow receptacle portion 54' at one end to accept a threaded or non-threaded connection component on a power tool and/or a lathe and/or a milling machine. However the present invention is not limited to such an embodiment and other embodiments can be used to practice the invention.

Figure 6:
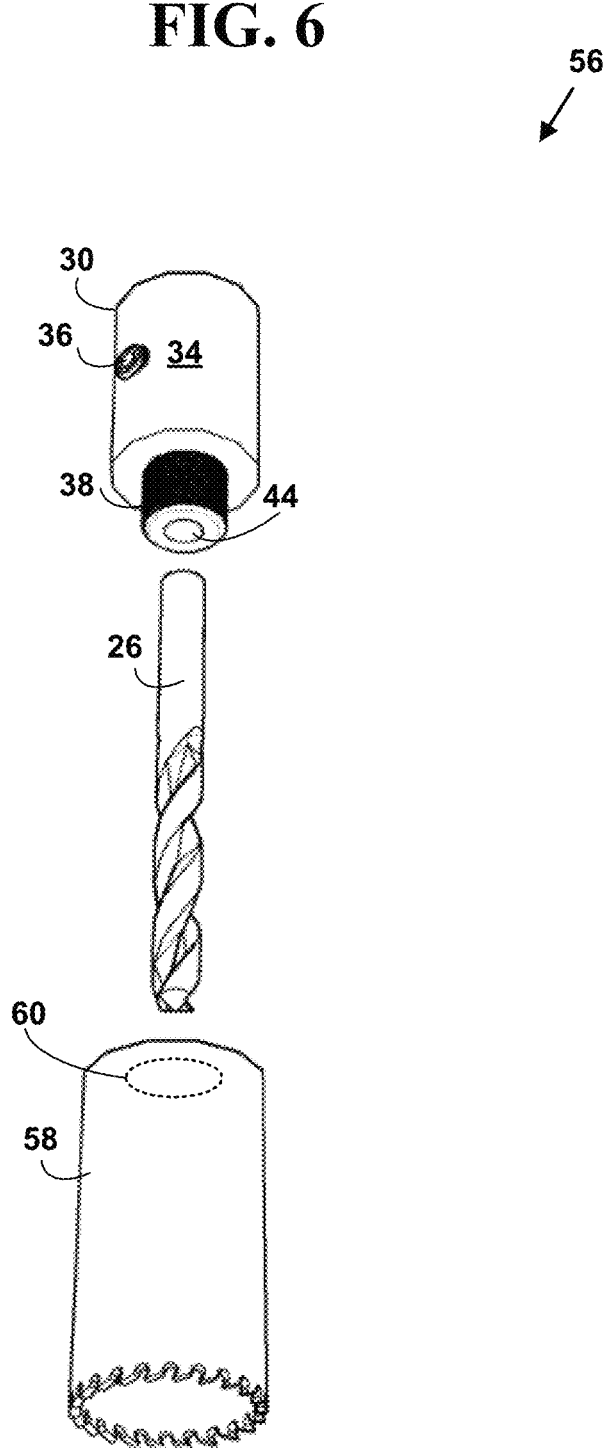
FIG. 6 is a block diagram illustrating another bottom perspective view of the dynamically configurable arbor assembly apparatus with tool components.

FIG. 6 is a block diagram 56 illustrating another bottom perspective view of the dynamically configurable arbor assembly apparatus 30 with tool components 26 and 58.

In FIG. 6, the tool component 26 (e.g., drill bit, etc.) is inserted into the second hollow receptacle 44 of the threaded connection 38 on the bottom surface of the body component 34 and into the hollow receptacle 40. It is secured via the securing component 36 on the side surface of the body component 34.

In FIG. 6, the tool component 58 (e.g., hole saw blade, etc.) includes a threaded receptacle 60. The tool component's 58 threaded receptacle 60 is rotated on the threaded connection component 38 on the bottom surface of the body component 34 for accepting, engaging and securing the tool component 58 with the threaded connection component 60 (i.e., screwed on, etc.).

The configurable arbor assembly apparatus 30 is capable of accepting tool components 26, 58 alone and/or in various combinations with threaded connectors and/or non-threaded connectors. In FIG. 6, the drill bit 26 and hole saw blade 58 are attached to the configurable arbor assembly apparatus 30 separately but in combination provide a standard hole saw with a pilot drill bit. Other various combinations of tool components can be used to practice the invention.

However, the present invention is not limited to these embodiments and other embodiment can be used to practice the invention.

Figure 7:
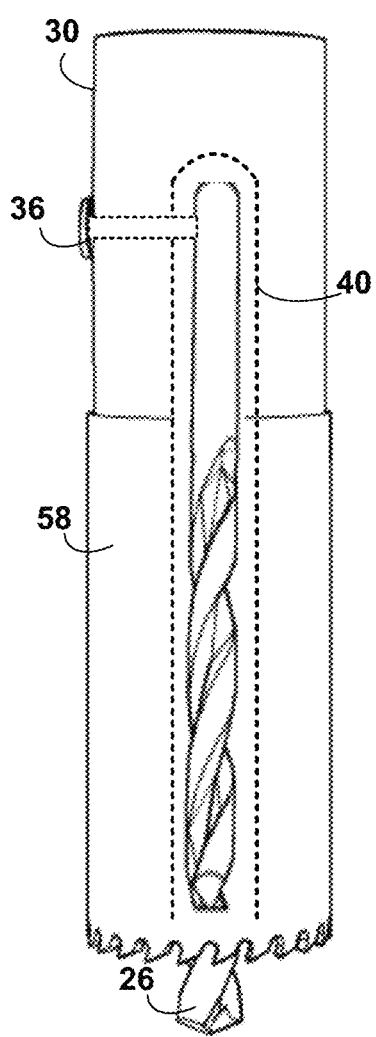
FIG. 7 is a block diagram illustrating a side perspective view of the dynamically configurable arbor assembly apparatus with tool components attached.

FIG. 7 is a block diagram 62 illustrating a side perspective view of the dynamically configurable arbor assembly apparatus 30 with two tool components 26, 58 attached.

Figure 8:
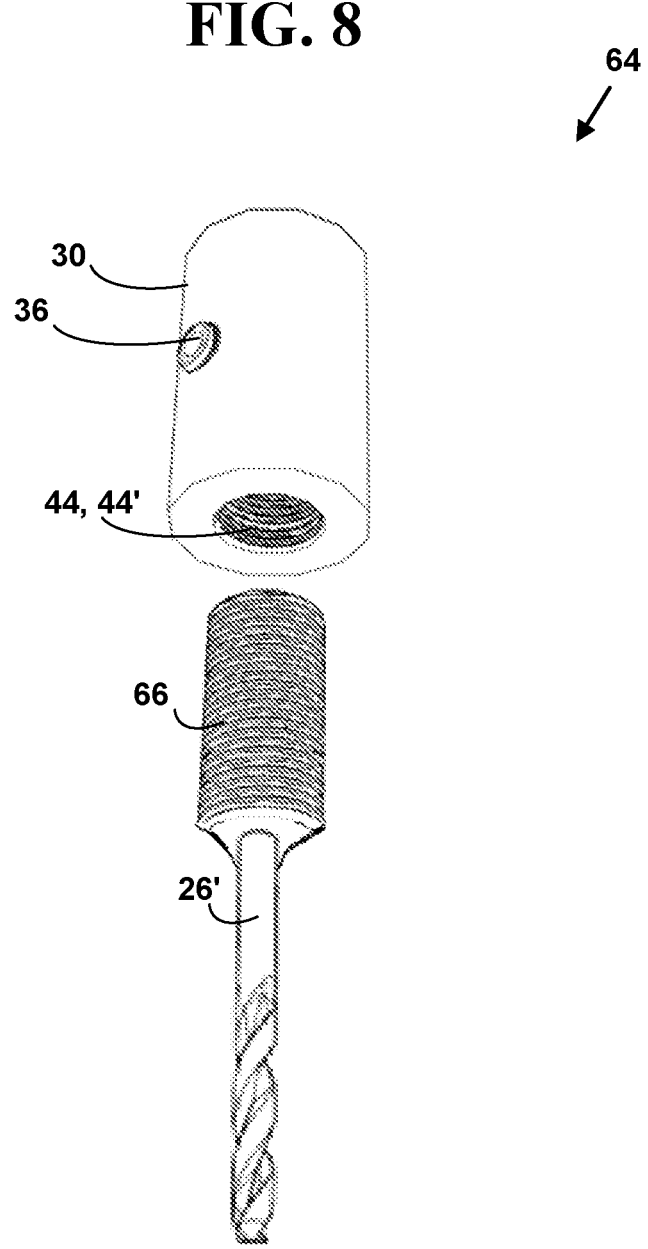
FIG. 8 is a block diagram illustrating another bottom perspective view of the dynamically configurable arbor assembly apparatus with other tool components.

FIG. 8 is a block diagram 64 illustrating another bottom perspective view of the dynamically configurable arbor assembly apparatus 30 with other tool components 26'.

In FIG. 8, tool component 26' includes a threaded connection component 66 for accepting, engaging and securing the tool component 26' into the second threaded receptacle 48 (FIG. 4) on the bottom surface of the body component 34. In this embodiment, the threaded connection component 38' is dynamically attachable and removable from the body component 34 and is removed before the tool component 26' is attached the second threaded receptacle 48.

In the FIG. 8 the tool component 26' includes a threaded connection component 66 that is also dynamically attachable into and removable from the second hollow receptacle 44" in the threaded connection component 38' on the bottom surface of the body component 34 illustrated in FIG. 4.

In FIG. 8, the configurable arbor assembly apparatus 30 in this embodiment is additionally capable of accepting tool components 26' with threaded connectors that are attachable and removable from two different connector components on the configurable arbor assembly apparatus 30.

Figure 9A:
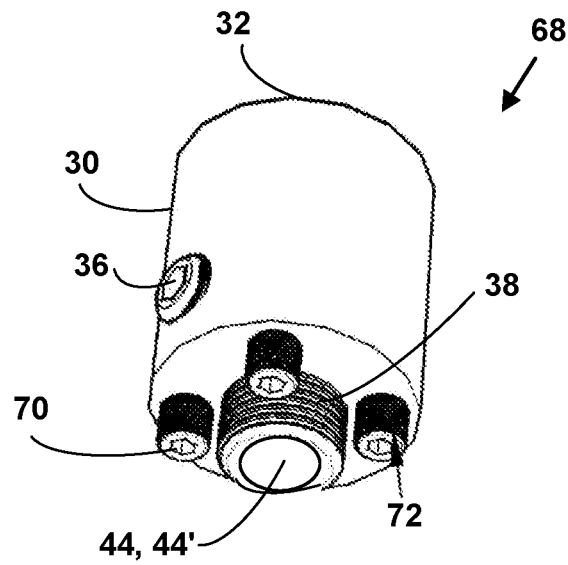
FIG. 9A is a block diagram illustrating another bottom perspective view of the dynamically configurable arbor assembly apparatus with locking components in an engaged or open position.

FIG. 9A is a block diagram 68 illustrating another bottom perspective view of the dynamically configurable arbor assembly apparatus 30 with locking components 70 in an engaged or open position 72.

Figure 9B:
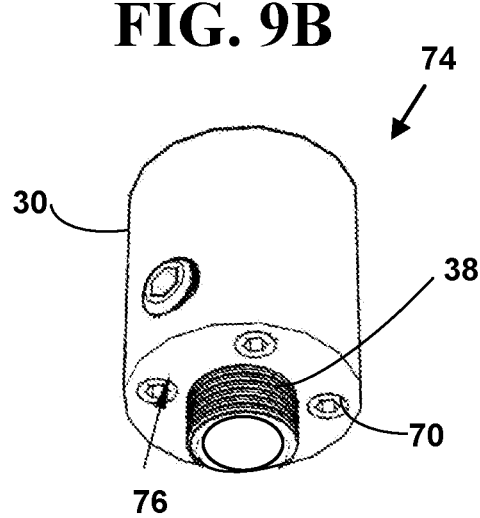
FIG. 9B is a block diagram illustrating another bottom perspective view of the dynamically configurable arbor assembly apparatus with locking components in a disengaged or closed position.

FIG. 9B is a block diagram 74 illustrating another bottom perspective view of the dynamically configurable arbor assembly apparatus 30 with locking components 70 in a disengaged or closed position 76.

Figure 9C:
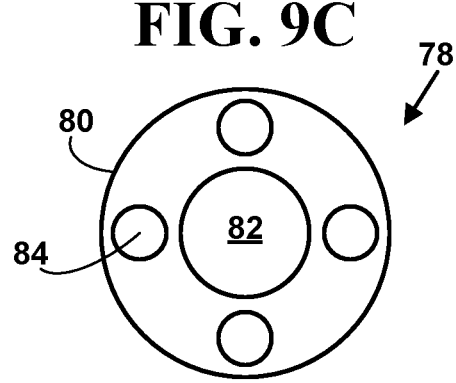
FIG. 9C is a block diagram illustrating bottom view of a top surface of a tool component.

FIG. 9C is a block diagram 78 illustrating bottom view of a top surface of a tool component 80.

A "locking component" 70 is used on top surface 80 of a tool component (e.g., 58, etc.) to locate, align, locking and further secure a top surface of the tool component 58 to the bottom surface of the configurable arbor assembly apparatus 30. The locking components 70 help prevent unwanted rotation, wobbling and other undesirable movements of the tool component 58 during its use.

FIGS. 9A and 9B illustrate three of four locking components 70 included on the bottom surface of the bottom component of the configurable arbor assembly apparatus 30. The four locking components 70 align and locate four receptacle components 84 on a top surface of a tool component 80 (also the top surface of tool component 58, etc.). However, the present invention is not limited to four locking components and more or fewer locking components can be used to practice the invention.

The locking components 70 are individually dynamically adjustable for exposing different lengths in many different configurations. For example, in one embodiment, one locking pin 70 could be engaged while the other three locking pins are disengaged to locate an engaging top surface of a tool component 58 with one receptacle 84 for engaging the one locking pin. In another embodiment, all four locking pins may be engaged to half their maximum length to engage a top surface 80 of a tool component 58 of a pre-determined thickness with four receptacles 84. In another embodiment, all four locking pins may be engaged to their maximum length to engage a top surface 80 of a tool component 58 of a second thicker pre-determined thickness with four receptacles 84. However, the present invention is not limited to these embodiments and other embodiments with other multiple configurations of the locking components 70 may be used to practice the invention.

FIG. 9C illustrates a large receptacle 82 for engaging the threaded connection component 38 on the bottom surface of the body component 34. FIG. 9C also illustrates four small receptacles 84 for engaging the four locking components 70 on the bottom surface of the configurable arbor assembly apparatus 30.

FIG. 9C illustrates a top surface 80 of a tool component 58 with four receptacles 84 for engaging the four locking components 70. However, the present invention, is not limited to such an embodiment, and tool components with zero through four, and/or more receptacles for engaging locking components 70 can be used to practice the invention.

In one embodiment, the locking components 70 include threaded screws and/or threaded pins and/or a combination thereof. In such an embodiment, the locking components 70 as thread screws and/or pins can be dynamically adjusted in small or large amounts to engage top surfaces of tool components of varying thicknesses. In another embodiment, non-threaded pins, screws, bolts, rivets and/or locking components are used to practice the invention. However, the present invention is not limited to such embodiments and other types of locking components 70 can be used to practice the invention.

In one embodiment, the locking components 70 included a threaded screw or bolt with an oval, circular, square or hexagonal head. The shape of the locking components 70 is dynamically adjustable by replacing the locking components 70 including a different shape for accepting, engaging and securing a desired tool component with a desired specific shape.

In one embodiment, the large receptacle 82 includes a threaded receptacle connection component that is rotated on the threaded connection component 38 on the bottom surface of the body component 34. In another embodiment, the large receptacle includes an unthreaded receptacle connection component. However, the present invention is not limited to such embodiments and other embodiments can also be used to practice the invention.

The locking components 70 can be engaged and disengaged individually. Therefore the configurable arbor assembly apparatus 30 can be dynamically configured for use with tool components 58 with zero through locking receptacles. However, the present invention is not limited to such embodiments and other embodiments can also be used to practice the invention.

Figure 10:
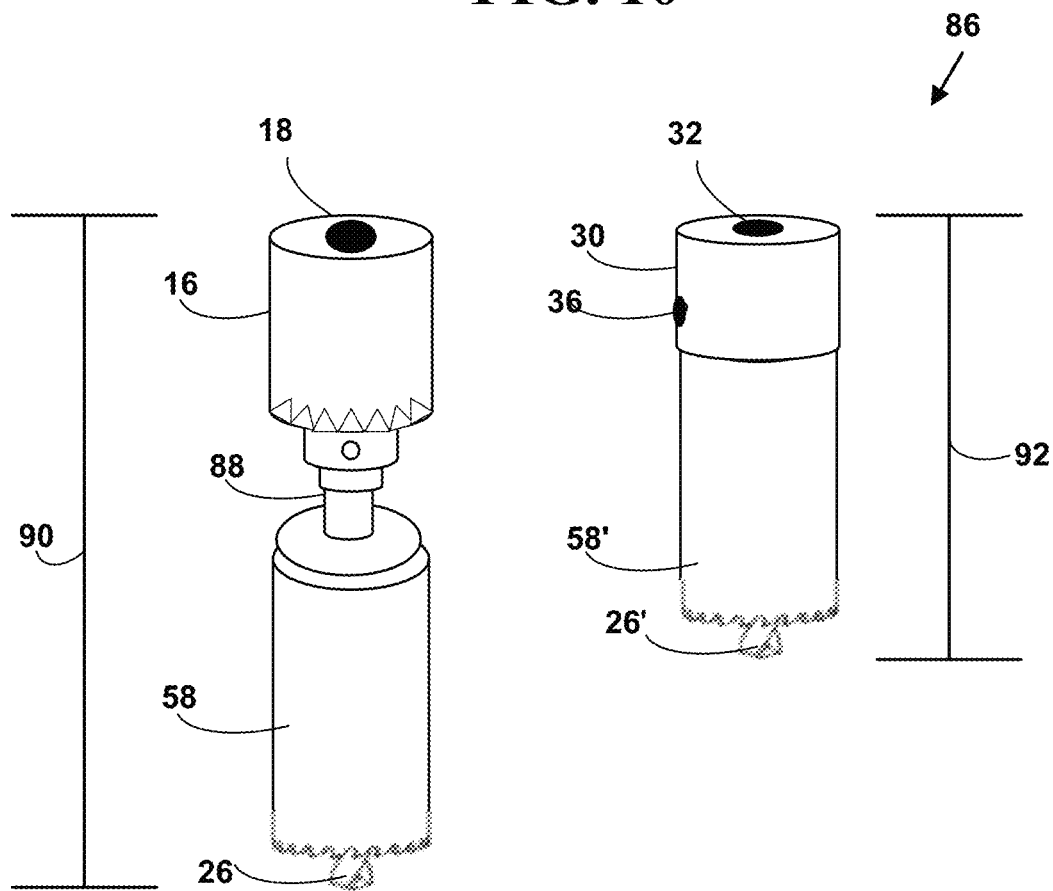
FIG. 10 is a block diagram illustrating a side view of the prior art power tool apparatus with tool components attached and the dynamically configurable arbor assembly apparatus with tool components attached.

FIG. 10 is a block diagram 86 illustrating a side view of the prior art power tool apparatus 12 with tool components 58, 26 attached and the dynamically configurable arbor assembly apparatus 30 with tool components attached 58', 26'.

As is illustrated in FIG. 10, the power tool apparatus 12 requires an adapter component 88 including a shaft portion 22 (not visible in the figure) that is inserted in the chuck component 16 on the power tool apparatus 12.

Since the configurable arbor assembly apparatus 30 does not require the chuck component 16 and it accepts a portion of tool component 26 into the hollow portion 40, it decreases a total length required for using the configurable arbor assembly apparatus 30 with the power tool apparatus 12. Therefore, a total length 90 to use the prior art power tool apparatus 12 with attached tool components 26, 58 is greater than a total length 92 to use the configurable arbor assembly apparatus 30. Thus, the configurable arbor assembly apparatus 30 can be used more effectively with power tools in smaller, more confined areas.

Figure 11:
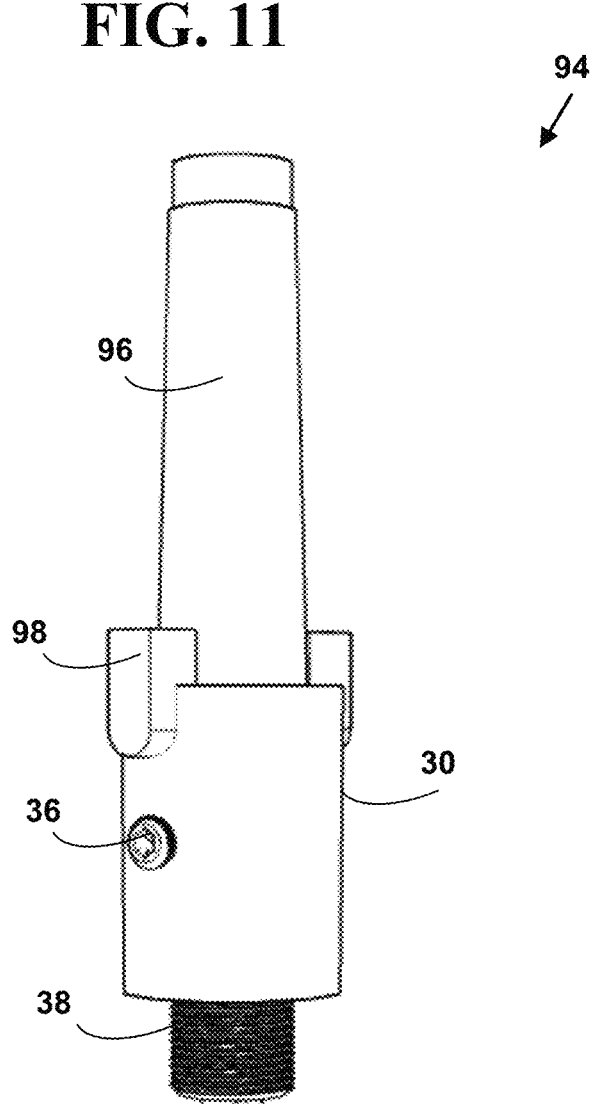
FIG. 11 is a block diagram illustrating a side view of the dynamically configurable arbor assembly apparatus with a drive dog component.

FIG. 11 is a block diagram 94 illustrating a side view of the dynamically configurable arbor assembly apparatus 30 with a drive dog component 96 with plural dog ears 98.

A "dog ear" includes a component 98 that is shaped like an ear of an actual dog with a flat horizontal top portion and rounded, curved bottom portion. Dog ear components are commonly used to attach and secure a component to another component.

The dog ears 98 include notches on a bottom portion to engage the top surface of the configurable arbor assembly apparatus 30 to secure the drive dog component 96 and prevent unwanted rotations during use. A top end of the drive dog component 96 is inserted into a power tool 12 and/or lathe 25 and/or milling machine 27 that accepts drive dog components with the bottom end of the drive dog component 96 connected to the surface of the configurable arbor assembly apparatus 30.

In one embodiment, a bottom end of the drive dog component 96 includes a threaded connection component (not visible in the drawings) that is inserted into the threaded receptacle connection component 32 on the top surface of the body component 34 for accepting, engaging and securing the drive dog component 96 to the configurable arbor assembly apparatus 30. In another embodiment, the bottom end of the drive dog component 96 includes a threaded receptacle connection component that is inserted onto the threaded connection component 58 (FIG. 5) on the top surface of the configurable arbor assembly apparatus 30. However, the present invention is not limited to such embodiments and other embodiments can be used to practice the invention.

Figure 12:
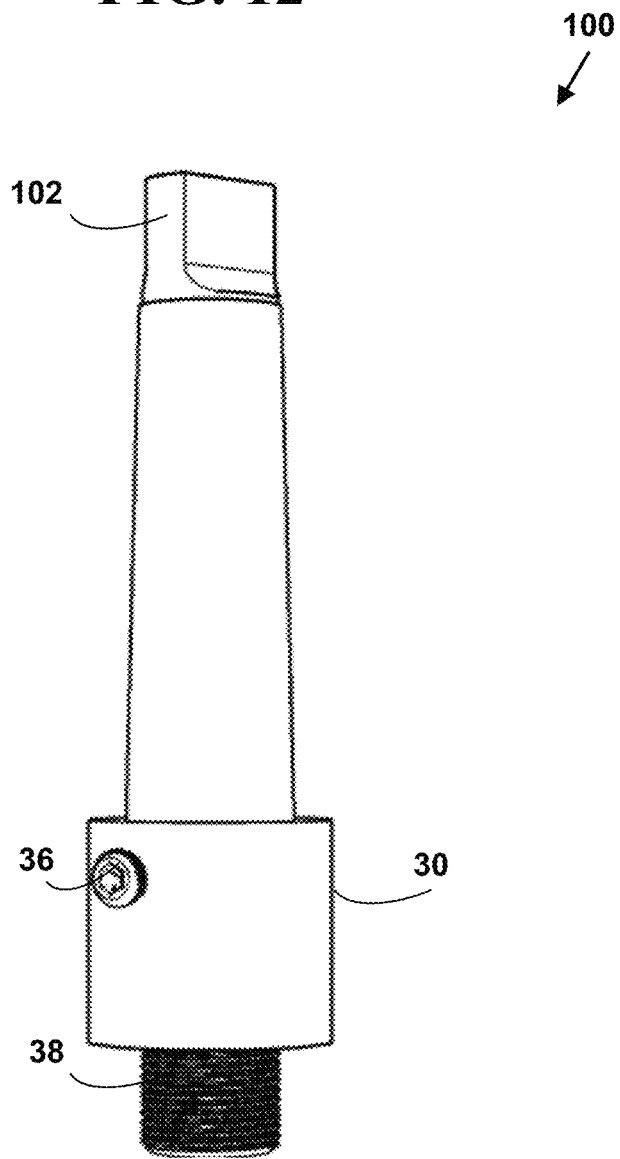
FIG. 12 is a block diagram illustrating a side view of the dynamically configurable arbor assembly apparatus with a tanged end component.

FIG. 12 is a block diagram 100 illustrating a side view of the dynamically configurable arbor assembly apparatus with a tanged end component 102.

A "tang" includes a long and slender projecting strip, tongue, or prong forming part of an object, and serving as a means of attachment for another part, such as a handle, stock, shaft, etc.

A top end of the tanged end component 102 is inserted into a power tool 12 and/or lathe 25 and/or milling machine 27 that accepts tanged end components 102 with the bottom end of the tanged end component 102 connected to the top surface of the configurable arbor assembly apparatus 30.

In one embodiment, a bottom end of the tanged end component 102 includes a thread connection component (not visible in the drawings) that is inserted into the threaded receptacle connection component 32 on the top surface of the body component 34 for accepting, engaging and securing the tanged end component 102 the configurable arbor assembly apparatus 30. In another embodiment, the bottom end of the tanged end component 102 includes a threaded receptacle connection component that is inserted onto the threaded connection component 54 (FIG. 5) on the top surface of the configurable arbor assembly apparatus 30. However, the present invention is not limited to such embodiments and other embodiments can be used to practice the invention.

Figure 13:
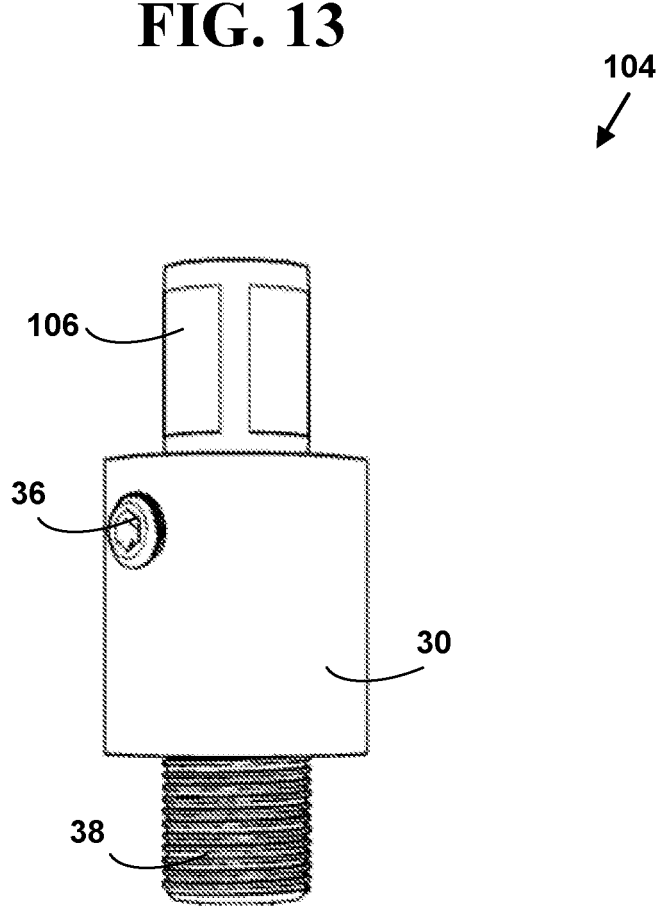
FIG. 13 is a block diagram illustrating a side view of the dynamically configurable arbor assembly apparatus with a weldon component.

FIG. 13 is a block diagram 104 illustrating a side view of the dynamically configurable arbor assembly apparatus 30 with a weldon component 106.

A "weldon" component 106 includes a flat section on a tool shank component. This flat section securely holds the tool component in a power tool 12 and/or lathe 25 and/or milling machine 27 and prevents the tool component from rotating when machining Weldon shanks are predominately used when milling but are used in other applications.

A top end of the weldon component 106 is inserted into a power tool 12 and/or lathe 25 and/or milling machine that accepts weldon components 106 with the bottom end of the weldon component 106 connected to the top surface of the configurable arbor assembly apparatus 30.

In one embodiment, a bottom end of the weldon component 106 includes a threaded connection component (not visible in the drawings) that is inserted into the threaded receptacle 32 on the top surface of the body component 34 for accepting, engaging and securing the weldon component 106 on the configurable arbor assembly apparatus 30. In another embodiment, the bottom end of the weldon component 106 includes a threaded receptacle connection component that is inserted onto the threaded connection component 54 (FIG. 5) on the top surface of the configurable arbor assembly apparatus 30. However, the present invention is not limited to such embodiments and other embodiments can be used to practice the invention.

Figure 14:
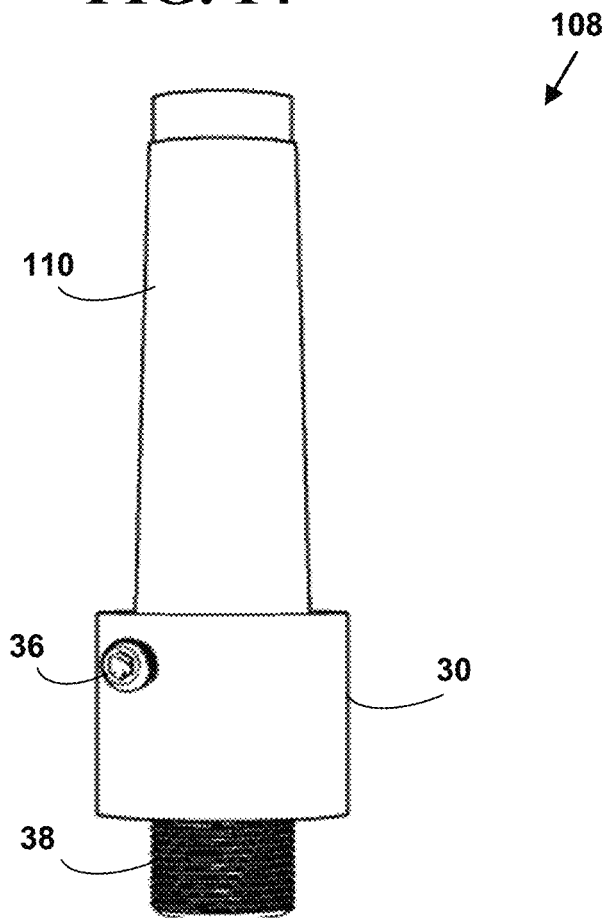
FIG. 14 is a block diagram illustrating a side view of the dynamically configurable arbor assembly apparatus with a direct mount component.

FIG. 14 is a block diagram 108 illustrating a side view of the dynamically configurable arbor assembly apparatus 30 with a direct mount component 110.

A "direct mount" component 110 is a component that directly mounts to a power tool 12 and/or lathe 25 and/or milling machine 27 instead of being attached with a separate connector.

A top end of the direct mount component 110 is inserted into a power tool 12 and/or lathe 25 and/or milling machine that accepts direct mount component 110 with the bottom end of the direct mount component 110 connected to the top surface of the configurable arbor assembly apparatus 30.

In one embodiment, a bottom end of the direct mount component 110 includes a threaded connection component (not visible in the drawings) that is inserted into the threaded receptacle connection component 32 on the top surface of the body component 34 for accepting, engaging and securing the direct mount component 110 on the configurable arbor assembly apparatus 30. In another embodiment, the bottom end of the direct mount component 110 includes a threaded receptacle connection component that is inserted onto the threaded connection component 54 (FIG. 5) on the top surface of the configurable arbor assembly apparatus 30. However, the present invention is not limited to such embodiments and other embodiments can be used to practice the invention.

Figure 15:
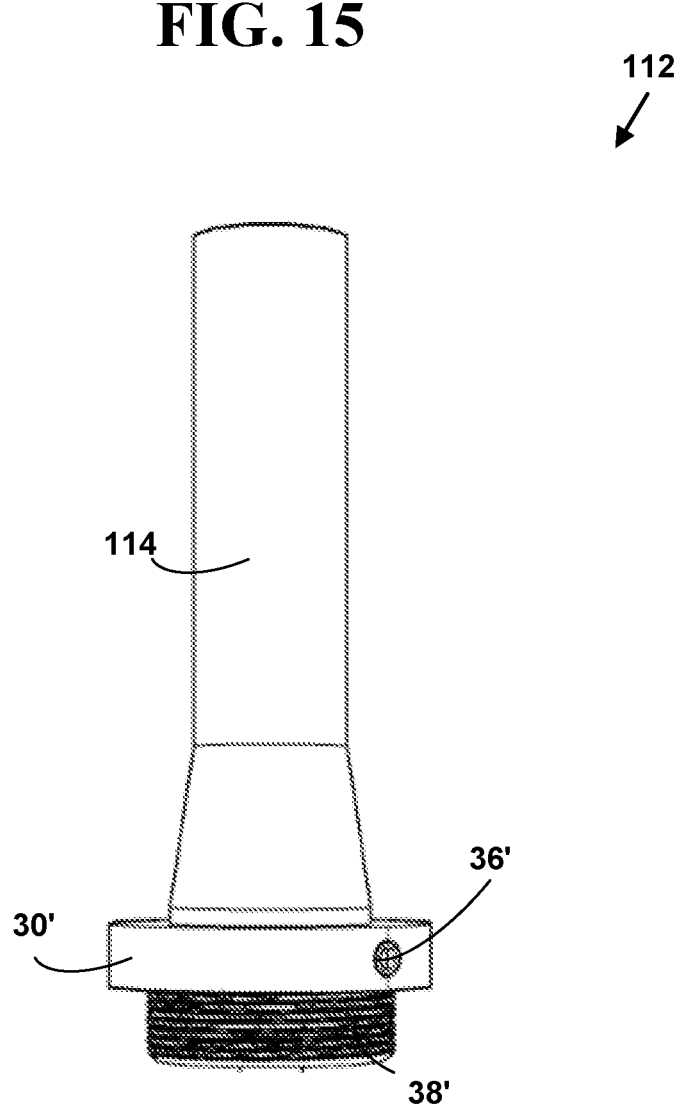
FIG. 15 is a block diagram illustrating a side view of a small profile dynamically configurable arbor assembly apparatus with a direct mount component.

FIG. 15 is a block diagram 112 illustrating a side view of the small profile dynamically configurable arbor assembly apparatus 30' with a direct mount component 114.

In one embodiment, the body component 34' of the small profile configurable arbor assembly apparatus 30' comprises a length of about one-half inch to about three-quarters inches (about 1.09 cm to about 2.54 cm). However, the present invention is not limited to such an embodiment and other lengths can be used practice the invention.

The small profile configurable arbor assembly apparatus 30' is necessary to property fit into existing spaces on a desired power tool that accepts direct mount components 114.

A top end of the direct mount component 114 is inserted into a power tool 12 and/or lathe 25 and/or milling machine 27 that accepts the direct mount component 114 with the bottom end of the direct mount component 114 connected to the top surface of the configurable arbor assembly apparatus 30.

In one embodiment, a direct mount component 114 includes a threaded connection component (not visible in the drawings) that is inserted into the threaded receptacle connection component 32' on the top surface of the body component 34' for accepting, engaging and securing the direct mount component 114 on the configurable arbor assembly apparatus 30. In another embodiment, the bottom end of the direct mount component 114 includes a threaded receptacle connection component that is inserted onto the threaded connection component 54 (FIG. 5) on the top surface of the configurable arbor assembly apparatus 30. However, the present invention is not limited to such embodiments and other embodiments can be used to practice the invention.

FIG. 15 illustrates a larger size threaded connection component 38' to be used with the direct mount. However, the present invention is not limited to such an embodiment and a standard size threaded connection component 38 can also be used to practice the invention with direct mount tools, lathes and/or milling machines.

Figure 16:
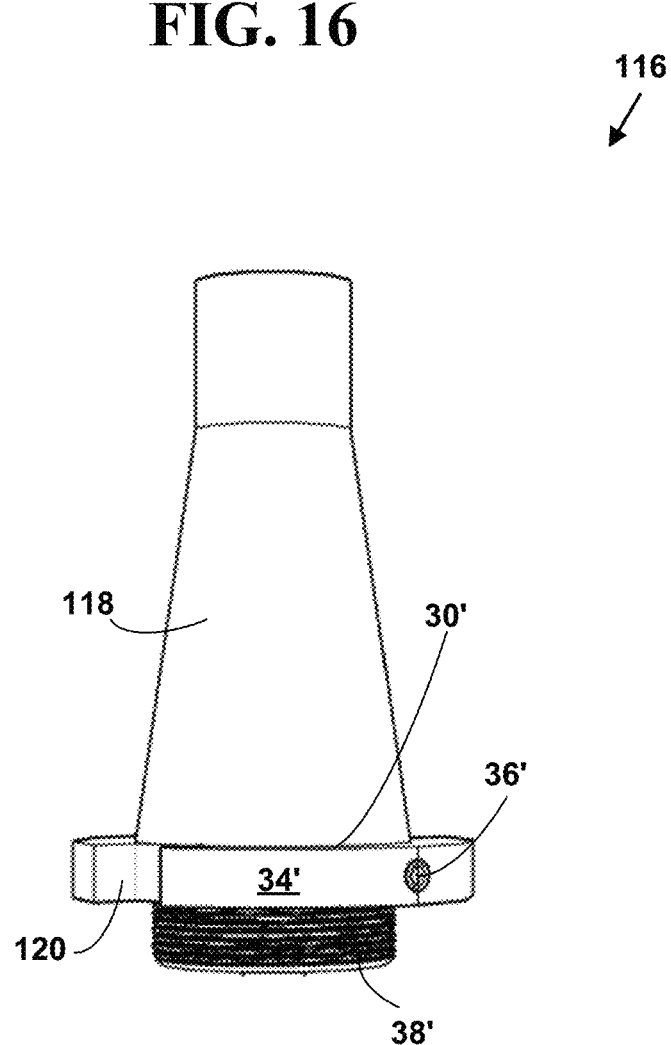
FIG. 16 is a block diagram illustrating a side view of the small profile dynamically configurable arbor assembly apparatus with a direct mount component with flanges.

FIG. 16 is a block diagram 116 illustrating a side view of a small profile dynamically configurable arbor assembly apparatus 30' with a direct mount component 118 with flanges 120.

A "flange" 120 includes a projecting flat rim, collar, or rib on an object, serving to strengthen or attach or to maintain a desired position.

FIG. 16 illustrates another exemplary version of configurable arbor assembly apparatus 30' with a small profile and one or more flanges 120 integral to the apparatus 30'. In another embodiment, the one or more flanges 120 are integral the direct mount component 118. However, the present invention is not limited to such embodiments and other embodiments can be used to practice the invention.

The small profile configurable arbor assembly apparatus 30' is necessary to property fit into existing spaces on a desired power tool that accepts direct mount components 118 with flanges 120.

A top end of the direct mount component 118 with flanges 120 is inserted into a power tool 12 and/or lathe 25 and/or milling machine 27 that accepts the direct mount component 118 with flanges 120 with the bottom end of the direct mount component 118 with flanges 120 connected to the top surface of the configurable arbor assembly apparatus 30.

In one embodiment, a direct mount component 118 with flanges 120 includes a threaded connection component (not visible in the drawings) that is inserted into the threaded receptacle connection component 32' on the top surface of the body component 34' for accepting, engaging and securing the direct mount component 118 with flanges 120 on the configurable arbor assembly apparatus 30. In another embodiment, the bottom end of the direct mount component 118 with flanges 118 includes a threaded receptacle connection component that is inserted onto the threaded connection component 54 (FIG. 5) on the top surface of the configurable arbor assembly apparatus 30. However, the present invention is not limited to such embodiments and other embodiments can be used to practice the invention.

FIG. 16 illustrates a larger size threaded connection component 38' to be used with the direct mount. However, the present invention is not limited to such an embodiment and a standard size threaded connection component 38 can also be used to practice the invention with direct mount tools 12, and/or lathes 25 and/or milling machines 27.

Figure 17:
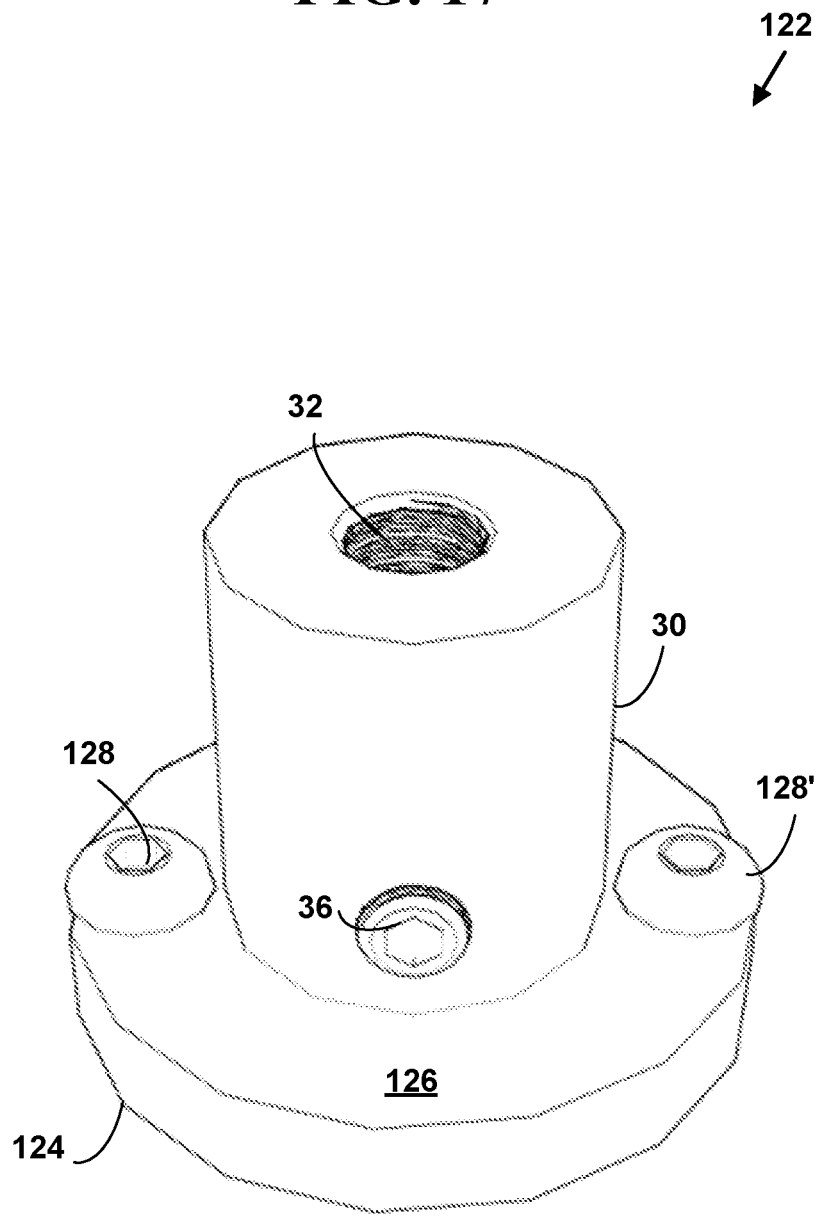
FIG. 17 is a block diagram illustrating a top perspective view of the dynamically configurable arbor assembly apparatus with a hole saw flange direct mount component.

FIG. 17 is a block diagram 122 illustrating a top perspective view of the dynamically configurable arbor assembly apparatus 30 with a hole saw flange direct mount component 124.

Figure 18:
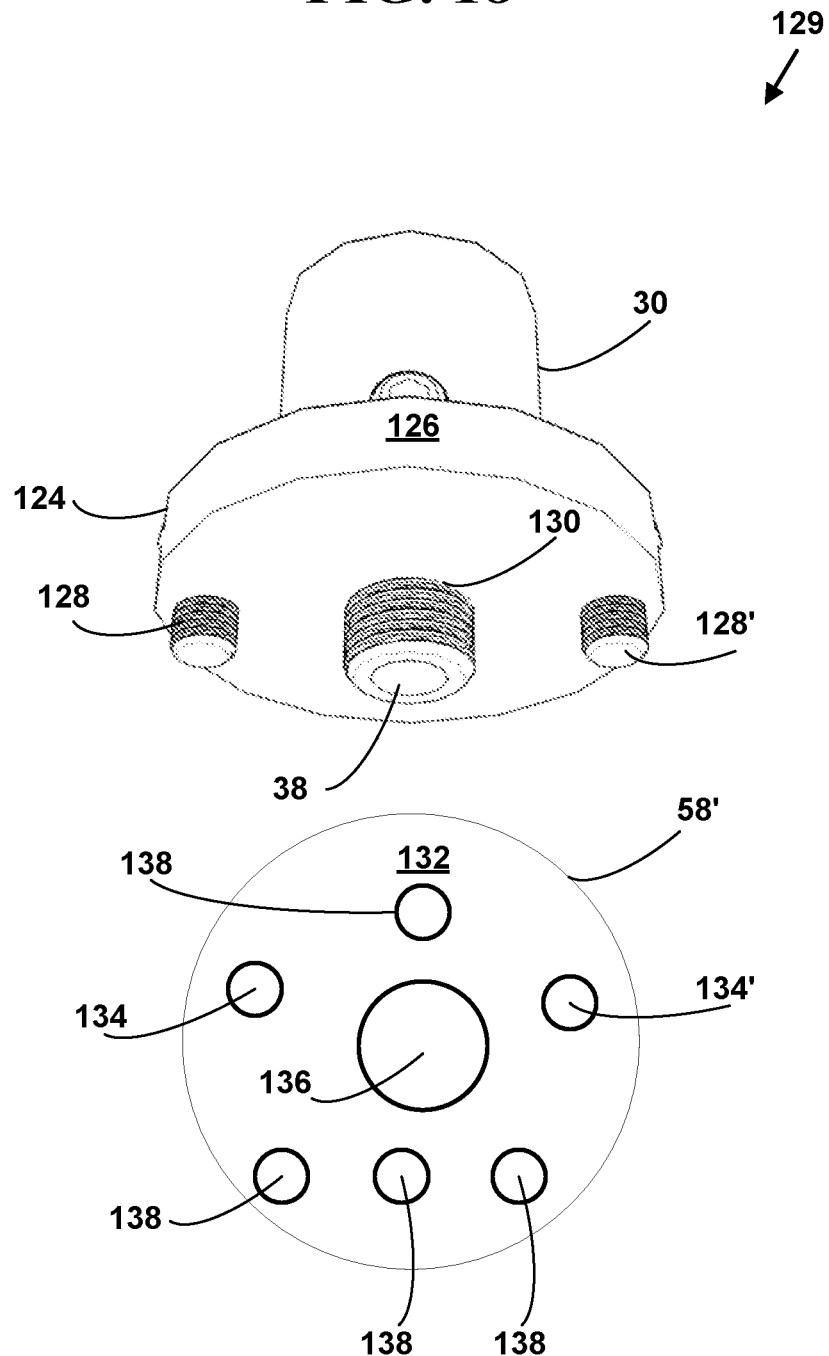
FIG. 18 is a block diagram illustrating a bottom perspective view of the dynamically configurable arbor assembly apparatus with a hole saw flange direct mount component.

FIG. 18 is a block diagram 129 illustrating a bottom perspective view of the dynamically configurable arbor assembly apparatus 30 with a hole saw flange direct mount component 124.

The hole saw flange direct component 124 includes a body component 126 of a pre-determined diameter size that fits within and engages the sides of hole saw bit 58. The body component 126 helps align the inside of the hole saw bit 58 around the body component 126 of the hole saw flange direct component 124. The hole saw flange direct component 124 includes one or more locking components 128, 128' (two of which are illustrated for simplicity) to increase stability and prevent unwanted rotation, wobbling and other undesirable movements of the hole saw bit 58 during its use and a threaded receptacle 130 for engaging the threaded connection component 38 of the dynamically configurable arbor assembly apparatus 30. The one or more locking components 128, 128' are individually adjustable to different exposed lengths to locate and engage hole saw bits 58 with varying top surface 80 thicknesses. The hole saw flange direct component 124 is attached to the dynamically configurable arbor assembly apparatus 30 with the threaded connection component 38.

FIG. 9 illustrates the dynamically configurable arbor assembly apparatus 30 including locking components 70 integral to the dynamically configurable arbor assembly apparatus 30. In FIG. 9, a hole saw bit 58 is attached directly to a bottom surface of the dynamically configurable arbor assembly apparatus 30. In FIG. 9, a diameter of the hole saw bit 58 is about the same as the dynamically configurable arbor assembly apparatus 30.

FIG. 17 illustrates the dynamically configurable arbor assembly apparatus 30 including a separate attachable and removable hole saw flange direct mount component 124 that includes one or more locking components 128, 128'. In FIG. 17, the hole saw bit 58 is attached to a bottom surface of the hole saw flange direct mount component 124 and not directly to the dynamically configurable arbor assembly apparatus 30 as is illustrated in FIG. 9. In FIGS. 17 and 18, the diameter of the hole saw bit 58' is much larger than the diameter of the dynamically configurable arbor assembly apparatus 30. Therefore the hole saw flange direct mount component 124 with an equivalent diameter is used to provide stability for the hole saw bit 58'.

FIG. 18 illustrates an exemplary top surface 132 of another exemplary hole saw bit 58' with two small receptacles 134, 134' to engage locking components 128, 128' of the bottom surface of the hole saw flange direct mount component 124, a large receptacle 136 to engage the threaded connection component 38 of the dynamically configurable arbor assembly apparatus 30 and four additional small receptacles 138 that are not used to engage any locking components. In another embodiment, A pre-determined diameter of the hole saw flange direct mount component 124 is slightly smaller (e.g. about 1-2 millimeters (mm) than the diameter of the hole saw bit 58' so the hole saw flange direct mount component 124 fits snuggly inside the hole saw flange direct mount component 124.

In one embodiment, the hole saw flange direct mount component 124 is produced in one or more different diameters to locate and engage one or more hole saw bits 58 of the one or more different diameters. However, the present invention is not limited to this embodiment and other embodiments can be used to practice the invention.

In one embodiment, the components in FIGS. 11 through 18 include 2 separate components the dynamically configurable arbor assembly apparatus 30 and the individual components, 96, 102, 106, 110, 114, 118 and 124. In this embodiment, all of the individual components 96, 102, 106, 110, 114, 118 and 124 are dynamically removable and attachable.

In another embodiment, the components in FIGS. 11 through 18 include single components the dynamically configurable arbor assembly apparatus 30 and the individual components, 96, 102, 106, 110, 114, 118 and 124 integral to the dynamically configurable arbor assembly apparatus 30 In this embodiment, all of the individual components 96, 102, 106, 110, 114, 118 and 124 fixed together and not dynamically removable and attachable.

A dynamically configurable arbor assembly apparatus is present herein. The dynamically configurable arbor assembly apparatus provides plural configurations with removable and attachable components that can be dynamically adjusted and configured to be used with a large variety of power tools, lathes and/or milling machines including plural different attachment interfaces. The dynamically configurable arbor assembly apparatus can also replace a chuck component the power tools, lathes and/or milling machines.

It should be understood that the architecture, materials, processes, methods and systems described herein are not related or limited to any particular type of system unless indicated otherwise. Various types materials and components may be used with or perform operations in accordance with the teachings described herein.

In view of the wide variety of embodiments to which the principles of the present invention can be applied, it should be understood that the illustrated embodiments are exemplary only, and should not be taken as limiting the scope of the present invention. For example, the components in the diagrams may be used in sequences other than those described, and more or fewer elements may be used in the components.

The claims should not be read as limited to the described order or elements unless stated to that effect. In addition, use of the term "means" in any claim is intended to invoke 35 U.S.C. § 112, paragraph 6, and any claim without the word "means" is not so intended. Therefore, all embodiments that come within the scope and spirit of the following claims and equivalents thereto are claimed as the invention.

I claim:

1. A dynamically configurable arbor assembly apparatus, comprising in combination:
   a threaded receptacle connection component within a top surface of a body component for accepting, engaging and securing the dynamically configurable arbor assembly apparatus on a power tool, milling machine or on a lathe;
   a tool component with one or more locking receptacles on a top surface of the tool component, the one or more receptacles extending through the total component for dynamically locating, aligning and locking the tool component onto a bottom surface of the body component of the dynamically configurable arbor assembly apparatus and preventing unwanted rotation, wobbling and other undesirable movements of the tool component during its use with the dynamically configurable arbor assembly apparatus,
   the tool component comprising a hole saw blade;
   a securing component on a side surface of the body component for securing the tool component inserted within a hollow receptacle in the body component;
   a threaded connection component on the bottom surface of the body component for accepting, engaging and securing the tool component, the threaded connection component including a hollow receptacle component on a bottom surface of the threaded connection component for accepting, engaging and securing the tool component through the threaded connection component into the hollow receptacle component in the body component; and one or more locking components on the bottom surface of the body component, the one or more locking components locating, aligning, locking and further securing a top surface of the tool component to the bottom surface of the configurable arbor assembly apparatus, the one or more locking components locating, aligning, locking into the one or more locking receptacles on the top surface of the tool component, the one or more locking components preventing unwanted rotation, wobbling and other undesirable movements of the tool component during its use, the one or more locking components including threaded screws or a combination thereof, to dynamically engage into an open position and dynamically disengage into a closed position, individual ones of the one or more locking components, or a combination thereof, the one or more locking components in an open position dynamically locating, aligning, locking into the one or more individual locking receptacles on the top surface of the tool component and preventing unwanted rotation, wobbling and other underirable movements of the tool component during its use, the one or more locking components dynamically adjustable to various lengths in an engaged open position to engage top surfaces of tool components of varying thicknesses.

2. The dynamically configurable arbor assembly apparatus of the claim 1 wherein the body component comprises a metal, rubber, plastic, wood, composite material or a combination thereof.

3. The dynamically configurable arbor assembly apparatus of the claim 1 wherein the hollow receptacle component on the bottom surface of the threaded connection component includes an oval, circular, square, star or hexagonal shape for accepting an oval, circular, square, star or hexagonal shaped tool component.

4. The dynamically configurable arbor assembly apparatus of the claim 1 further comprising, a drill bit component, dynamically attachable to and removable from, the body component.

5. The dynamically configurable arbor assembly apparatus of the claim 1 wherein, the hollow receptacle component on the bottom surface of the threaded connection component includes threads for accepting a threaded tool component.

6. The dynamically configurable arbor assembly apparatus of the claim 5 further comprising:

the threaded tool component dynamically attachable to and removable from the hollow receptacle component on the bottom surface of the threaded connection component including the threads for accepting the threaded tool component.

7. The dynamically configurable arbor assembly apparatus of the claim 1 further comprising:

a second threaded receptacle connection component attachable to and removable from, the threaded receptacle connection component within the top surface of the body component of the dynamically configurable arbor assembly apparatus, for accepting, engaging and securing a different tool compnent on the dynamically configurable arbor assembly apparatus.

8. the dynamically configurable arbor assembly apparatus of the claim 7 wherein, the second threaded receptacle connection component includes a hollow receptacle component within a top surface of the second threaded receptacle connection component.

9. The dynamically configurable arbor assembly apparatus of the claim 7 wherein, the second threaded receptacle connection component includes a hollow receptacle component within a top surface of the second threaded receptacle connection component includes threads for accepting a threaded tool component or a power tool, lathe or milling machine that accepts threaded components.

10. A dynamically configurable arbor assembly apparatus, comprising in combination:

a threaded receptacle connectin component within a top surface of a body component for accepting, engaging and securing the dynamically configurable arbor assembly apparatus on a power tool, milling machine or on a lather;

a securing component on a side surface of the body component for securing a tool component inserted within a hollow receptacle in the body component;

a tool component with one or more locking receptacles on a top surface of the tool component, the one or more receptacles extending throught the tool component, for dynamically locating, aligning and locking the tool component onto a bottom surface of the body component of the dynamically configurable arbor assembly apparatus and preventing unwanted rotation, wobbling and other underirable movements of the tool component during its use with the dynamically configurable arbor assembly apparatus, wherein the tool component includes a drill bit and a hole saw blade;

a threaded connection component on the bottom surface of the body component for accepting, engaging and securing the tool component, the threaded connection component including a hollow receptacle component on a bottom surface of the threaded connection component for accepting, engaging and securing the tool component through the threaded connection component into the hollow receptacle component in the body component, the hollow receptacle including a threaded or non-threaded hollow receptacle in a plurality of different sizes on the bottom surface of the threaded connection component for accepting, engaging and securing a threaded or non-threaded tool component of the plurality of different sizes; and one or more locking components on the bottom surface of the body component, the one or more locking components locating, aligning, locking and furthere securing a top surface of the tool component to the bottom surface of the configurable arbor assembly apparatus, the one or more locking components locating, aligning and locking into one or more locking receptacles on the top surface of the tool component, the one or more locking commponents preventing unwanted rotation, wobbling and other undesirable movements of the tool component during its use, the one or more locking components including threaded screws or a combination thereof, to dynamically engage into an open position and dynamically disengage into a closed position, individual ones of the one or more locking components, or a combination thereof, the one or more locking components in an open position dynamically locating, aligning, locking into the one or more individual locking receptacles on the top surface of the tool component and preventing unwanted rotation, wobbling and other undesirable movements of the tool component during its use, and the one or more locking components dynamically adjustable to various lengths in an engaged open position to engage top surfaces of tool components of varying thicknesses.

* * * * *